Oct. 19, 1965     L. R. LUCHFORD ETAL     3,212,807
LOADING PALLETS

Filed May 16, 1963     3 Sheets-Sheet 1

INVENTORS
LAURENCE R. LUCHFORD
GORDON L. RATCLIFFE

ATTYS.

Oct. 19, 1965 L. R. LUCHFORD ETAL 3,212,807
LOADING PALLETS
Filed May 16, 1963 3 Sheets-Sheet 2

INVENTORS
LAURENCE R. LUCHFORD
GORDON L. RATCLIFFE

*Smith & Smiley*
Att'ys.

Oct. 19, 1965  L. R. LUCHFORD ETAL  3,212,807
LOADING PALLETS
Filed May 16, 1963  3 Sheets-Sheet 3
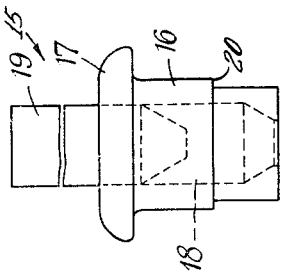
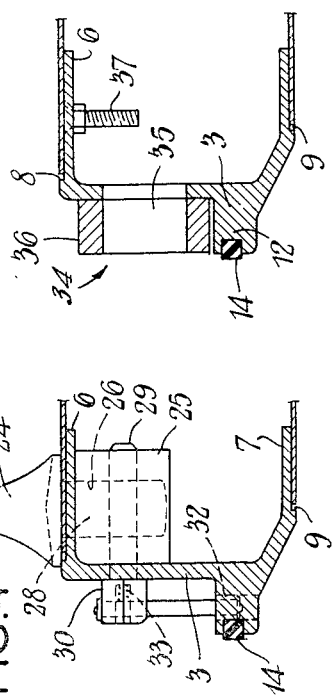
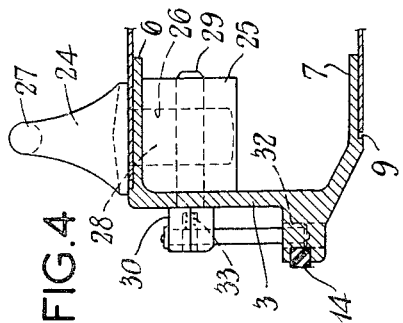
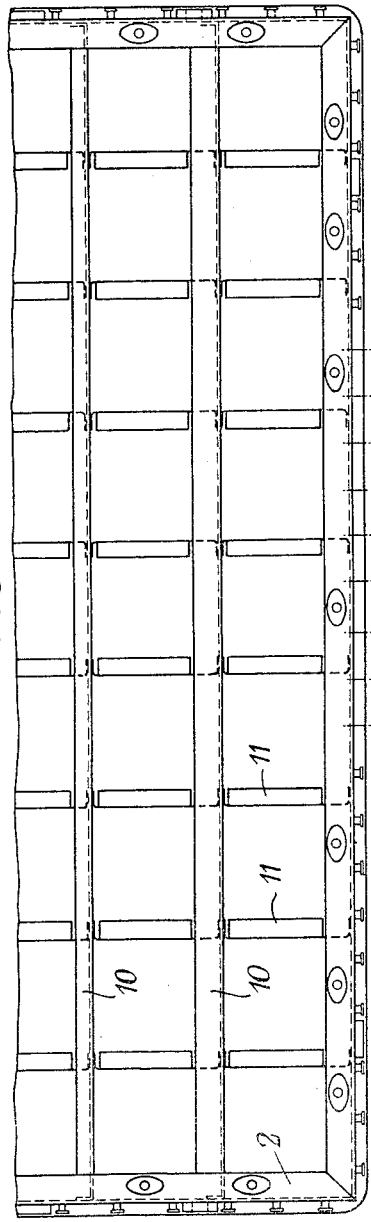
INVENTORS
LAURENCE R. LUCHFORD
GORDON L. RATCLIFFE
Attys.

United States Patent Office 3,212,807
Patented Oct. 19, 1965

3,212,807
LOADING PALLETS
Laurence Richard Luchford and Gordon Leslie Ratcliffe,
East Molesey, Surrey, England, assignors to Trianco
Limited, East Molesey, Surrey, England
Filed May 16, 1963, Ser. No. 280,956
13 Claims. (Cl. 294—67)

This invention relates to pallets for freight loading, particularly for use in aircraft. Such pallets should be of low height and low weight to reduce loss of cargo space and freight capacity and should be of great strength under such applied conditions as lifting by slings, movement on conveyors, high acceleration or deceleration and movement both vertically and horizontally, whilst carrying loads secured thereon. Provision should also be made for securing loads by nets passing over the load and engaged over net-buttons on the pallet, by lashing straps on chains engaging lashing shackles or on supporting cradles or brackets fixed to the pallet.

The pallets are secured in position in an aircraft by spigots forming part of a side guidance system existing in the aircraft, these spigots engaging in sockets provided in the sides of the pallet.

From one aspect, the present invention provides a pallet for freight loading having a plurality of net buttons protruding horizontally from the vertical side faces of the pallet and a net-retaining dolly adjacent each button with its axis vertical, these dollies being flexible to permit of movement to allow a net loop to be engaged over the button.

From another aspect, a pallet for freight loading according to the invention comprises an outer peripheral frame having a projecting rib extending outwardly from the vertical face thereof, this rib forming a side guidance rubbing strip for the pallet and preferably being grooved along its vertical face to receive anti-friction material. This extension may be rounded at each corner of the pallet to assist guiding of the pallet into an aircraft. It also lends itself to the provision of a wide chamfer on the edges of the pallet to enable it to pass freely over ball and roller conveyors.

The net buttons are attached to the vertical face of the peripheral frame and the net retaining dollies may be mounted on the top horizontal edge of the protruding rib.

The pallet is of stressed-skin construction comprising an outer frame of channel members with top and bottom metal sheets infilled by longitudinal and transverse box sections attached to the sheets and in turn to each other. The top and bottom outer surfaces of the four side channel members are recessed on their inner edges to allow the sheets to be inset into the frame, so as to protect the edges of the sheets and to prevent them being picked up by anything sharp beneath them.

Other parts of the invention are embodied in the preferred form which will now be described in some detail by way of example with reference to the accompanying drawings in which FIG. 1 is a plan view, partly cut away of an aircraft freight loading pallet.

FIG. 4 is a section on the line IV—IV of FIG. 2.

FIG. 5 is a section on the line V—V of FIG. 2.

FIG. 6 is a view of a detail of a net button.

FIG. 7 is a plan view of one end of the pallet on a larger scale than FIG. 1 with the top skin removed.

Figure 1:
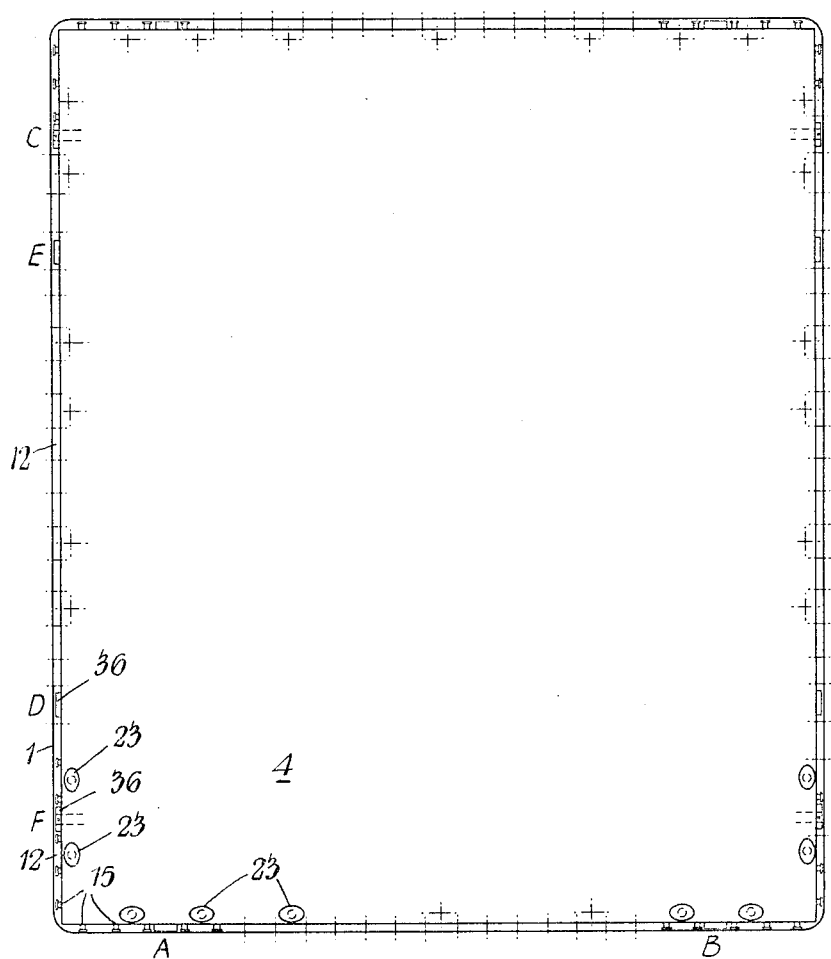
Figure 2:
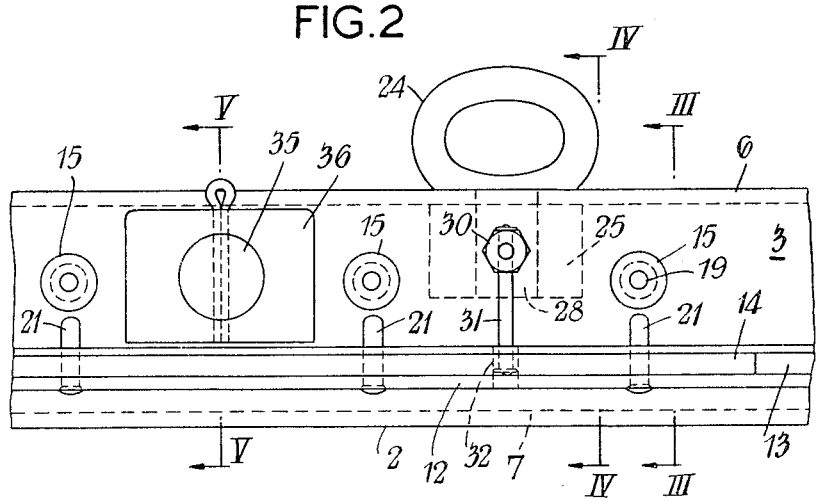
FIG. 2 is a side view of part of the pallet to an enlarged scale.
Figure 3:
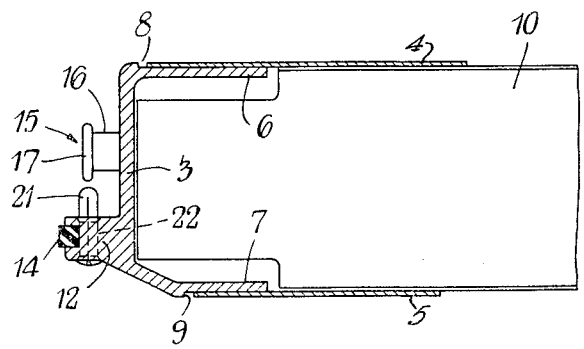
FIG. 3 is a section on the line III—III of FIG. 2.

In this form the pallet comprises a peripheral rectangular frame 1 having two short sides and two long sides, each side comprising a channel member 2 arranged with its web 3 vertical and its open side directed inwardly. Top and bottom sheets 4, 5 extend over this rectangular frame, the edges of these sheets lying on the flanges 6, 7 of the side channel members 2 which are recessed to receive them. A narrow rib or projection 8, 9 is left on the channel flanges to protect the edges of the sheets as they pass over roller conveyors and to prevent lifting of the sheets by a sharp implement or the like inserted beneath them.

A number of box members 10 extend transversely between the two long sides and these box members are connected by other box members 11 extending in the longitudinal direction of the pallet. The top and bottom sheets 4, 5 are secured to the box members 10, 11 which are also secured to one another. These box members act as spacers and as compression resistant members. The pallet is thus of a stressed skin construction and is capable of high deflection under excess load conditions when suspended at its slinging points without taking a permanent set.

The side channel members 2 are formed with a longitudinal rib 12 on the outer vertical face of the web 3 towards the bottom of the web, the web being chamfered from this rib to the bottom flange 7. The rib 12 is formed with a longitudinal groove 13 with its open side vertical, in which groove is inserted anti-friction material forming a side guidance rubbing strip 14.

At the corners of the pallet, the longitudinal ribs 12 are rounded off as shown in FIG. 1 without cutting into the main channel section. This facilitates the guiding of the pallet when moving and loading it into an aircraft. The wide chamfer provided on the bottom of the channel member 2 and made possible by the longitudinal rib 12 enables the pallet to pass freely over ball and roller conveyors.

Permanently fixed at suitable spacing along the side members of the pallet are a plurality of net buttons 15. Each button comprises a cylindrical shank 16 with an enlarged head 17 and is fixed to the web 3 of the side channel 2 above the longitudinal rib 12 with its axis projecting horizontally. These buttons may as shown in FIG. 6 be secured to the side channels from the outside so that they may be replaced if necessary without disturbing the top and bottom sheets. The button has an axial hole 18 which before use is tapered inwardly at the bottom. With the button in position with its shank passing through the web 3, a pin 19 is driven into the hole 18 and expands the tapered end to form a rivet head on the inside of the web. The shank of the button has a shoulder 20 which abuts against the outside of the web.

Adjacent each net button 15 is a net retaining member 21 (referred to as a dolly) which is formed of a flexible synthetic material capable of withstanding extremes of temperature. This dolly 21 extends vertically from the top face of the longitudinal rib 12 beneath the enlarged head 17 of the net button, its top lying close to this head. The dolly 21 is sufficiently flexible that it may be moved back to allow a net loop to be passed over the head of the button and will spring back to retain the loop on the button whilst the net is being drawn tight over stores loaded on the pallet.

The dolly 21 is preferably formed from a length of material of semi-circular section, bent double with the flat faces in contact, its ends being threaded through a hole 22, countersunk on both sides, in the longitudinal rib 12. The material springs outwardly when released and grips the sides of the hole firmly so as to be retained in position.

Sockets 23 are provided on the top face of the pallets near each of the four sides in which lashing-shackles 24 may be inserted. At each socket position, a metal block 25 is fixed inside the side channel member 2 immediately beneath the upper flange 6 and a vertical hole 26 is formed through the top sheet, this top flange and the block. The lashing shackle 24 comrpises a ring shaped top 27 with a shank 28 extending therefrom. In use, the shank 28 is inserted into the hole 26 and is retained in position by a retaining pin 29 passed through aligned holes in the vertical web 3 of the side channel 2 and the block 25 and in the shank 28 of the shackle.

This retaining pin 29 is formed with a hexagonal head 30 to which a spanner may be applied to free it should it become seized up. It is also provided with a tommy bar 31 slidable through a hole in the hexagonal head 30. This tommy bar 31 assists insertion of the retaining pin 29 and, when the latter is fully inserted, drops into a socket 32 formed in the top face of the longitudinal rib 12, thereby locking the retaining pin safely in position. The tommy bar is retained against movement due to vibration by a spring plunger 33 within the head of the retaining pin.

These sockets 23 can also be used for the reception of studs or other clamping means securing cradles or brackets to the pallet for some types of load. Such studs are formed with a shank exactly similar to that of the lashing shackle and are secured in a similar way. The studs are screw threaded and the brackets or cradles are bolted to the pallet by nuts threaded on the studs.

Provision is made on the sides of the pallet for the reception of the restraint spigots normally provided in the aircraft. Such provision comprises pairs of sockets on the four sides of the frame. Each socket 34 comprises a hole 35 formed through the web 3 of the side channel member 12 and through a strengthening block 36 fixed to the vertical web of the channel. One pair of sockets is provided at the points A, B on each short side of the pallet. One each long side, two pairs of sockets are provided at the points C, D and E, F respectively, each pair overlapping the other so that alternative positions are available when loading into the aircraft, and the pallet can be loaded any way round as desired.

The outer two of these restraint sockets 34 on each long side (at the points C, F) may be used as slinging points into which the four lifting pins at the ends of a conventional sling and spreader beam are inserted and secured by captive keep-pins passed through them. The pallet is strengthened at these slinging points by increasing the strength of the transverse box members in line with them.

To prevent the other sockets 34 on the long sides or those on the short sides being used as slinging points, means are provided to prevent the full insertion of the sling lifting pins. Such means may comprise an internal stop 37 projecting downwardly from the upper flange 6 of the side channel and preventing insertion of the lifting pin sufficiently to allow the insertion of the keep-pin.

The lashing shackles may be left in position when stores are secured by means of a net engaging the net buttons or may readily be removed if desired. The lashing shackles may be removed so that heavy loads may be moved sideways on to the pallet and the shackles may then be readily replaced.

It will be noted also that the net buttons are always present and available for use, even when the lashing shackles are in use.

It will be understood that the invention is not restricted to the details of the preferred form described by way of example which can be modified without departure from the broad ideas underlying them.

We claim:

1. A pallet for freight loading comprising a peripheral frame having substantially vertical outer, side faces, each of said outer side faces having a plurality of net buttons protruding horizontally therefrom and a net-retaining dolly adjacent each button with its axis vertical and its upper end spaced slightly from the button, said dollies being resilient to permit of movement under relatively slight horizontal pressure in opposite directions whereby to allow a net loop to be engaged over and disengaged from the button.

2. A pallet for freight loading comprising an outer peripheral frame having substantially vertical outer side faces, a projecting rib extending outwardly from each of said vertical faces and having a top, substantially horizontal surface, a plurality of net buttons protruding horizontally from each of said vertical side faces of the frame above said rib, and a resilient net retaining dolly adjacent each net button projecting upwardly from the top horizontal surface of the projecting rib with its upper end beneath but spaced from the associated net button.

3. A pallet according to claim 2 in which each of said net retaining dollies is formed by a strip of resilient material of semi-circular section, bent double with the flat face inwardly, said rib being provided with a hole for each dolly, and the ends of said strip of resilient dolly material being threaded through said hole.

4. A pallet according to claim 2 in which each of said net buttons is tubular and has a bore with a restricted inner end, and a pin inserted in said bore from outside the pallet to expand said restricted inner end for securing the button by expanding its inner end against the inside of the frame.

5. A pallet according to claim 2 in which each of said projecting ribs is provided with a groove along its vertical face, and anti-friction material forming a side guidance rubbing strip for the pallet is received in said groove.

6. A pallet according to claim 2 in which each of said projecting ribs is rounded at each corner of the pallet to assist guiding of the pallet into an aircraft.

7. A pallet according to claim 2 in which said peripheral frame is chamfered inwardly below the bottom surface of the projecting rib.

8. A pallet of stressed-skin construction according to claim 2 wherein said outer peripheral frame is formed of channel members, said channel members being connected by longitudinal and transverse elements having box sections, and top and bottom skin members are attached to said elements.

9. A pallet according to claim 8, in which said channel members each have upper and lower flanges which include recesses to receive the edges of the skin members.

10. A pallet according to claim 2 further comprising a plurality of sockets for the reception of lashing shackles adjacent each edge of the pallet.

11. A pallet according to claim 2 further comprising at least one pair of sockets on each vertical outer side face of said peripheral frame for the reception of restraining spigots provided in an aircraft.

12. A pallet according to claim 11 wherein said peripheral frame is rectangular and has two overlapping pairs of sockets on each long side, each pair of sockets being adapted to receive the retaining spigots so that the pallet may be loaded into an aircraft in alternative positions.

13. A pallet according to claim 12 in which some of said sockets are available to receive spigots of a lifting sling and the remainder of said sockets are provided with stop means limiting the insertion of spigots into the sockets to prevent receiving said lifting sling spigots.

References Cited by the Examiner

UNITED STATES PATENTS

| | | | |
|---|---|---|---|
| 1,522,707 | 1/25 | Andrews et al. | 294—67 X |
| 1,726,446 | 8/29 | McKinney | 24—236 |
| 1,830,998 | 11/31 | Harbord | 108—51 |
| 1,883,538 | 10/32 | Bywater | 280—179 X |
| 2,873,993 | 2/59 | Sarke | 293—62 |
| 3,065,987 | 11/62 | Elsner et al. | 294—67 |
| 3,093,092 | 6/63 | Martin et al. | 244—137 |

FOREIGN PATENTS 1,161,214  3/58  France.

M. HENSON WOOD JR., *Primary Examiner.*

LOUIS J. DEMBO, ROBERT B. REEVES, *Examiners.*